(12) United States Patent
Genda

(10) Patent No.: US 7,544,588 B2
(45) Date of Patent: Jun. 9, 2009

(54) LASER PROCESSING METHOD FOR WAFER

(75) Inventor: Satoshi Genda, Tokyo (JP)

(73) Assignee: Disco Corporation, Tokyo (JP)

( * ) Notice: Subject to any disclaimer, the term of this patent is extended or adjusted under 35 U.S.C. 154(b) by 249 days.

(21) Appl. No.: 11/480,515

(22) Filed: Jul. 5, 2006

(65) Prior Publication Data

US 2007/0007472 A1 Jan. 11, 2007

(30) Foreign Application Priority Data

Jul. 7, 2005 (JP) ............................. 2005-198866

(51) Int. Cl.
*H01L 21/46* (2006.01)

(52) U.S. Cl. ...................... 438/462; 438/463; 438/707; 257/E21.599

(58) Field of Classification Search ................ 438/463, 438/462, 707
See application file for complete search history.

(56) References Cited

U.S. PATENT DOCUMENTS

| | | | |
|---|---|---|---|
| 6,653,210 B2 * | 11/2003 | Choo et al. | 438/460 |
| 7,008,861 B2 * | 3/2006 | Andrews et al. | 438/463 |
| 2002/0166848 A1 * | 11/2002 | Furujo et al. | 219/121.71 |
| 2005/0109742 A1 * | 5/2005 | Nagai et al. | 219/121.73 |
| 2006/0105544 A1 * | 5/2006 | Takanashi et al. | 438/460 |
| 2006/0255431 A1 * | 11/2006 | Sekiya | 257/620 |
| 2007/0007472 A1 * | 1/2007 | Genda | 250/548 |
| 2007/0023691 A1 * | 2/2007 | Morishige et al. | 250/492.1 |

FOREIGN PATENT DOCUMENTS

JP 10-305420 11/1998

* cited by examiner

*Primary Examiner*—Alexander G Ghyka
(74) *Attorney, Agent, or Firm*—Smith, Gambrell & Russell, LLP (57) ABSTRACT

Disclosed herein is a laser processing method for a wafer having a plurality of regions defined by streets, with the regions having a plurality of devices formed therein. The method irradiates the wafer with a laser beam along the streets, thereby forming laser processed grooves along the streets. It includes a processed groove formation step of irradiating the wafer while positioning the beam's focus spot on an irradiation surface of the wafer, thereby forming the laser processed grooves; and a processed groove finishing step of irradiating the wafer along the laser processed grooves formed by the processed groove formation step, while positioning the focus spot beyond the bottom of the laser processed grooves, thereby finishing both sides of the laser processed grooves.

2 Claims, 8 Drawing Sheets

LASER PROCESSING METHOD FOR WAFER

FIELD OF THE INVENTION

This invention relates to a laser processing method for a wafer which forms laser processed grooves along streets formed in a wafer such as a semiconductor wafer.

DESCRIPTION OF THE PRIOR ART

In a semiconductor device manufacturing process, a plurality of regions are defined by division-scheduled lines, called streets, arranged in a lattice pattern on the face of a nearly disk-shaped semiconductor wafer, and devices, such as IC and LSI, are formed in these defined regions. The semiconductor wafer is cut along the streets to separate the regions, where the devices have been formed, thereby producing individual semiconductor chips. An optical device wafer, which has light receiving elements such as photodiodes, or light emitting elements such as laser diodes, laminated on the surface of a sapphire substrate, is also cut along streets, whereby the optical device wafer is divided into individual optical devices such as photodiodes or laser diodes for wide use as electrical equipment.

Among methods for dividing the above-mentioned wafer such as a semiconductor wafer or an optical device wafer along the streets is a method disclosed in Japanese Unexamined Patent Publication No. 10-305420, which irradiates the wafer with a pulsed laser beam along the streets formed in the wafer to form laser processed grooves, and breaks the wafer along the laser processed grooves.

The above method, however, faces the following problems: During irradiation with the laser beam, the material of the wafer is melted and solidified again to form spinelike or spiny protrusions on both sides (walls) of the laser processed grooves formed in the wafer, so that the quality of the device is deteriorated. When the chips separated along the laser processed grooves are picked up, moreover, the protrusions snap and fall off. Such protrusions are sucked into a suction hole of a collet to clog the suction hole, thus markedly shortening the life of the collet.

SUMMARY OF THE INVENTION

It is an object of the present invention to provide a laser processing method for a wafer, which does not leave spiny protrusions on both sides of laser processed grooves.

According to the present invention, there is provided, for attaining the above object, a laser processing method for a wafer, the wafer having a plurality of regions defined by streets formed in a lattice pattern on the face of the wafer, the defined regions having a plurality of devices formed therein, the method being arranged to irradiate the wafer with a laser beam along the streets, thereby forming laser processed grooves along the streets, comprising:

a processed groove formation step of irradiating the wafer with the laser beam, which has a wavelength absorbable to the wafer, along the streets, with a focus spot being positioned on a laser beam irradiation surface of the wafer, thereby forming the laser processed grooves along the streets; and a processed groove finishing step of irradiating the wafer with the laser beam, which has a wavelength absorbable to the wafer, along the laser processed grooves, with a focus spot being positioned beyond the bottom of the laser processed grooves formed by the processed groove formation step, thereby finishing both sides of the laser processed grooves.

The focus spot of the laser beam applied by irradiation in the processed groove finishing step may be set at a position 250 to 350 μm below the laser beam irradiation surface of the wafer.

According to the present invention, the processed groove formation step is performed for forming the laser processed grooves along the streets formed in the wafer. Then, the processed groove finishing step is performed for irradiating the wafer with the laser beam, which has a wavelength absorbable to the wafer, along the laser processed grooves, with the focus spot being positioned beyond the bottom of the laser processed grooves, thereby removing spiny protrusions formed on both sides of the laser processed grooves. Thus, the quality of the individually separated chips is not deteriorated. According to the present invention, moreover, the spiny protrusions formed on both sides of the laser processed grooves are removed by performing the processed groove finishing step in the above-mentioned manner. Thus, the event does not occur that when the chips are picked up, the pickup collet sucks the protrusions to clog the suction hole.

DETAILED DESCRIPTION OF THE PREFERRED EMBODIMENTS

Preferred embodiments of the laser processing method for a wafer according to the present invention will be described in further detail by reference to the accompanying drawings.

Figure 1:
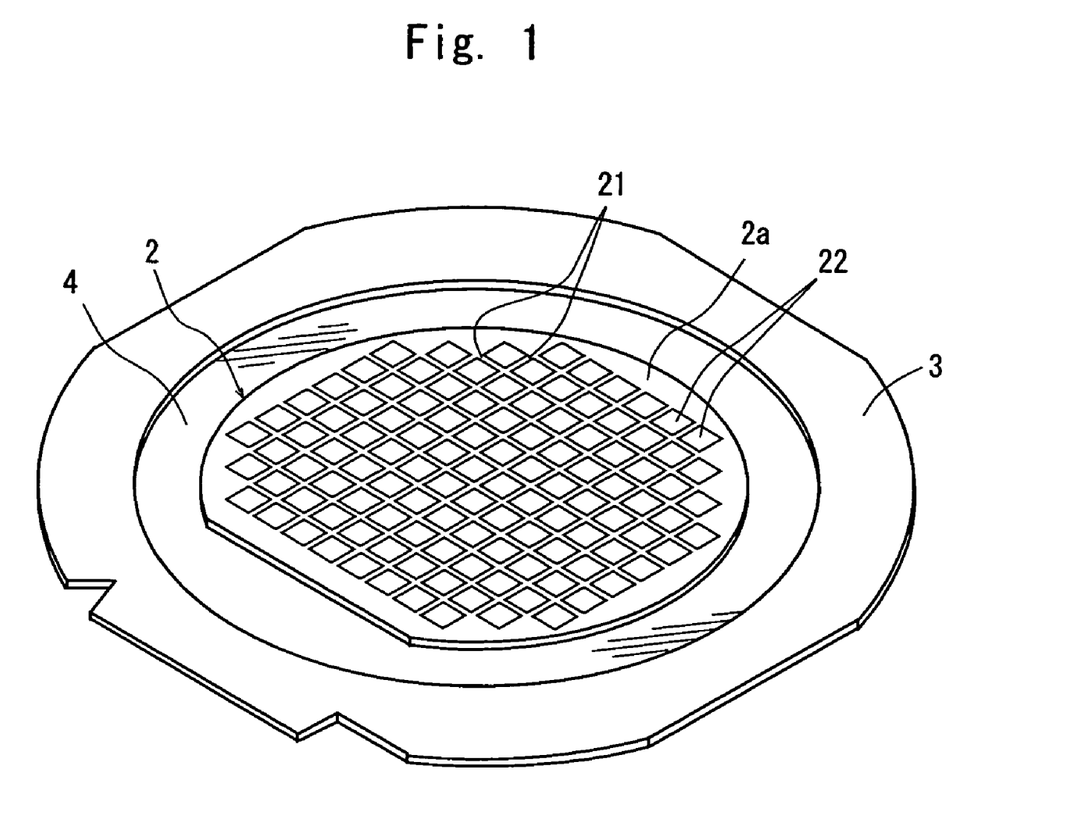
FIG. 1 is a perspective view showing a state in which a semiconductor wafer to be processed by the laser processing method for a wafer according to the present invention is mounted on a frame via a protective tape.

FIG. 1 shows a perspective view of a semiconductor wafer as a wafer to be processed by the laser processing method for a wafer according to the present invention. A semiconductor wafer 2 shown in FIG. 1 consists of a silicon wafer on whose face 2a a plurality of regions are defined by a plurality of streets 21 formed in a lattice pattern, and where devices 22 such as IC and LSI are formed in these defined regions. The so constituted semiconductor wafer 2 has its back stuck to a protective tape 4, which comprises a sheet of a synthetic resin such as polyolefin and which is mounted on an annular frame 3, with the face 2a, namely, the face where the streets 21 and the devices 22 are formed, being pointed upward.

Figure 2:
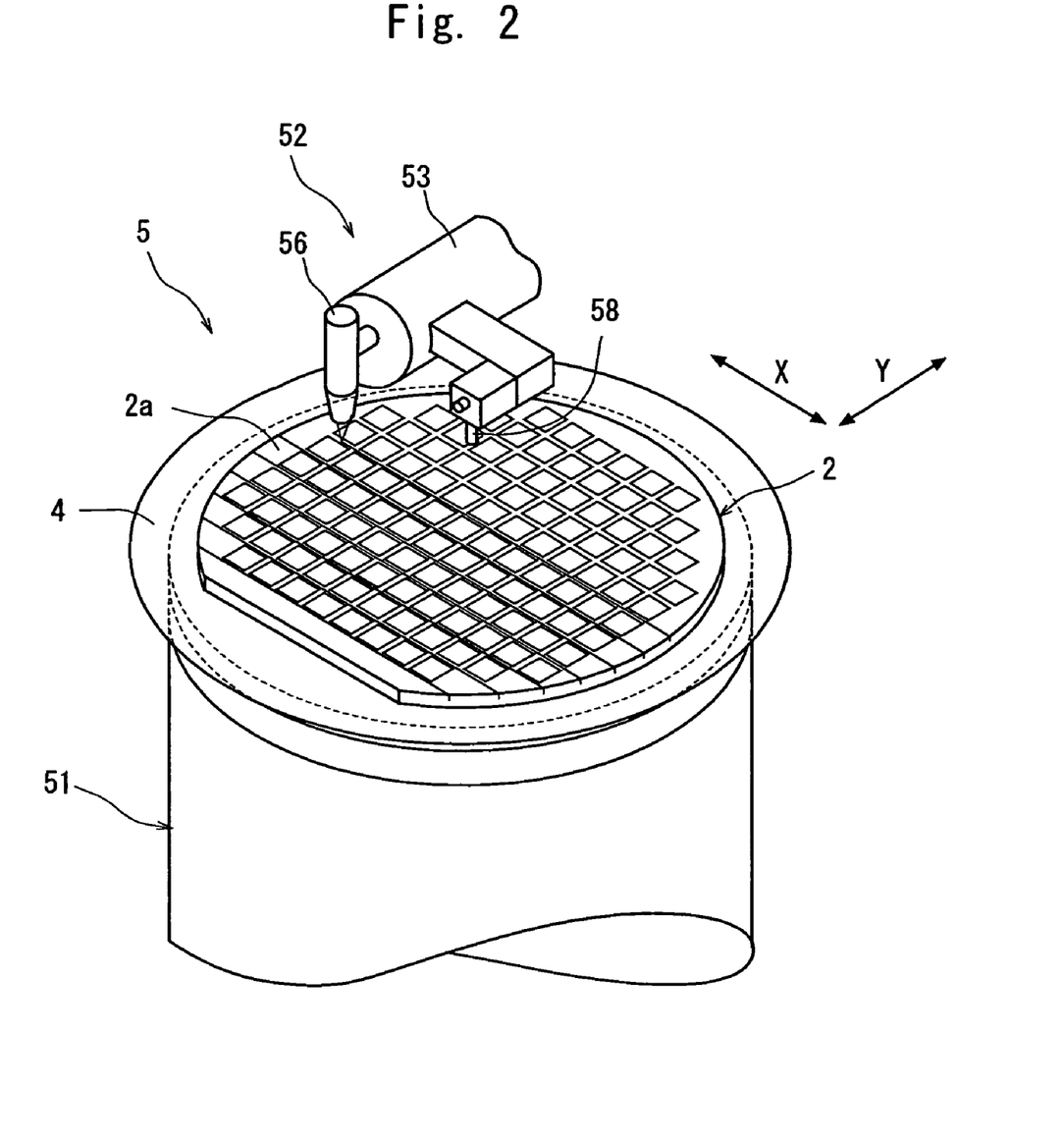
FIG. 2 is a perspective view of essential parts of a laser processing apparatus for performing the laser processing method for a wafer according to the present invention.
Figure 3:
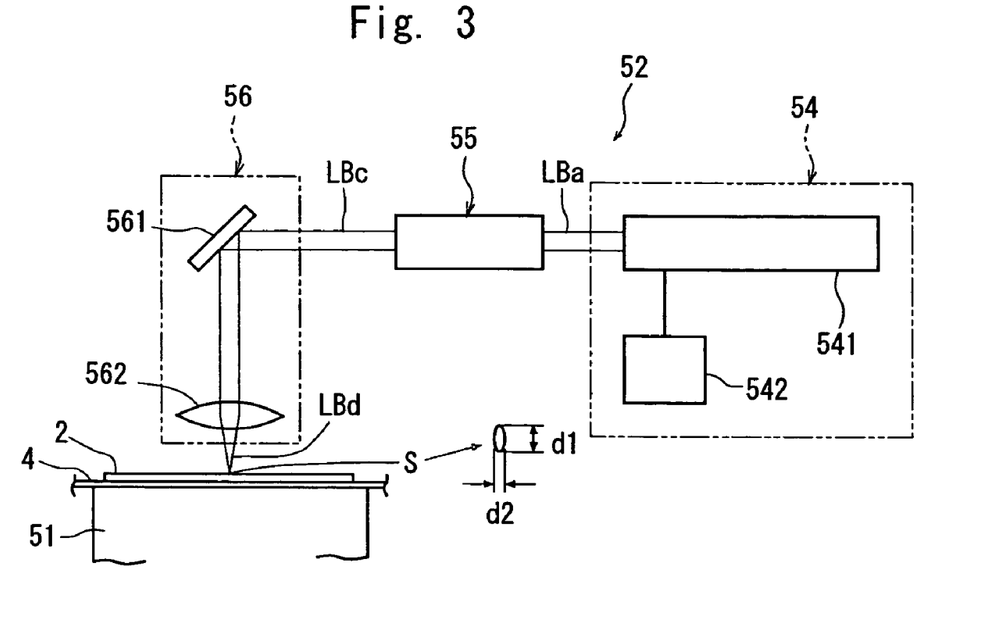
FIG. 3 is a block diagram schematically showing the configuration of a laser beam irradiation means installed in the laser processing apparatus shown in FIG. 2.
Figure 4:
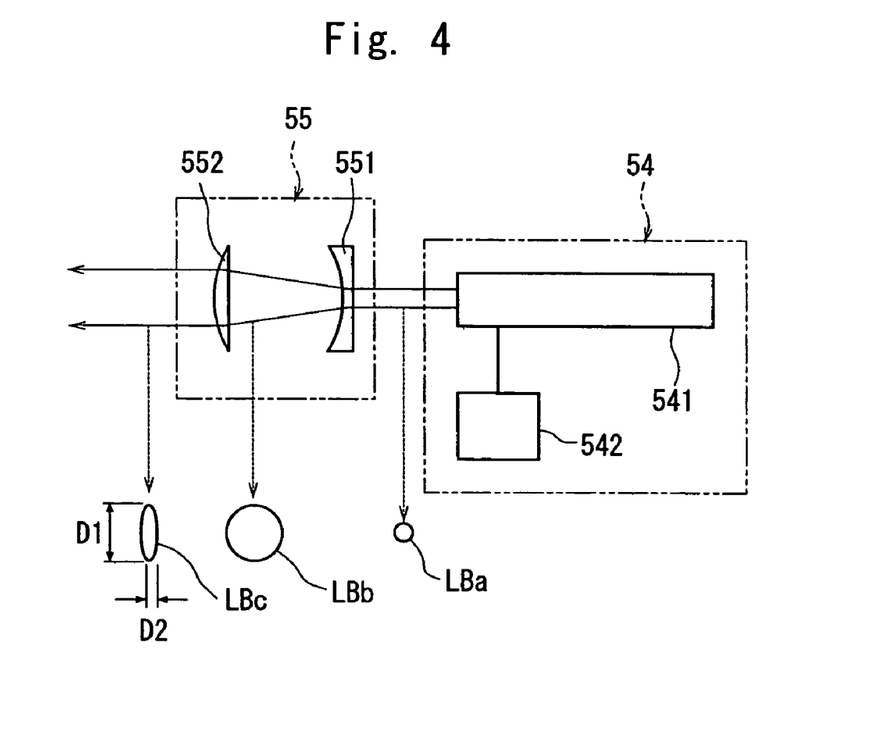
FIG. 4 is a block diagram of a pulsed laser oscillation means and a transmission optical system constituting the laser beam irradiation means shown in FIG. 3.
Figure 5:
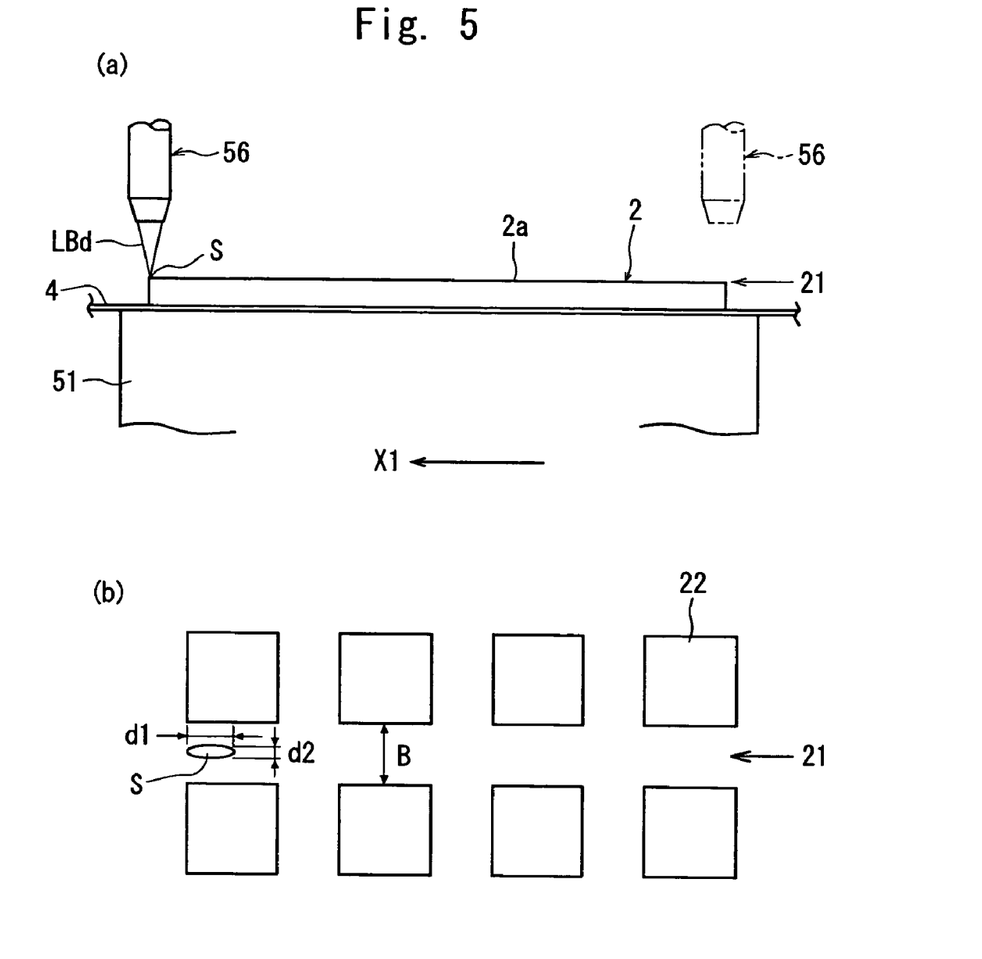
FIGS. 5(a) and 5(b) are explanation drawings of a processed groove formation step of the laser processing method for a wafer according to the present invention.

FIGS. 2 to 4 show a laser processing apparatus for performing the laser processing method according to the present invention. A laser processing apparatus 5 shown in FIGS. 2 to 4 is equipped with a chuck table 51 for holding a workpiece, a laser beam irradiation means 52 for irradiating the workpiece held on the chuck table 51 with a laser beam, and an imaging means 58 for imaging the workpiece held on the chuck table 51. The chuck table 51 is structured to suck and hold the workpiece, and is adapted to be moved in a processing feed direction indicated by an arrow X and in an indexing feed direction indicated by an arrow Y shown in FIG. 2, by a processing feed mechanism and an indexing feed mechanism (not shown).

The laser beam irradiation means 52 includes a cylindrical casing 53 disposed substantially horizontally. A pulsed laser beam oscillation means 54 and a transmission optical system 55 are disposed in the case 53, as shown in FIG. 3. The pulsed laser beam oscillation means 54 is composed of a pulsed laser beam oscillator 541 comprising a YAG laser oscillator or a YVO4 laser oscillator, and a repetition frequency setting means 542 annexed thereto.

The transmission optical system 55 is equipped with a beam expander 551 and an ellipse shaper 552, as shown in FIG. 4. A laser beam LBa having a circular spot (cross-sectional shape) oscillated from the pulsed laser beam oscillation means 54 is expanded to a laser beam LBb having a circular spot (cross-sectional shape) by the beam expander 551, and further shaped into a laser beam LBc having an elliptical spot (cross-sectional shape; major axis D1, minor axis D2) by the ellipse shaper 552.

Returning to FIG. 3, a focusing implement 56 is mounted on the front end of the casing 53. The focusing implement 56 has a direction changing mirror 561, and a converging objective lens 562. Thus, the laser beam LBc (having an elliptical spot with the major axis D1 and the minor axis D2), which has been fed from the pulsed laser beam oscillation means 54 via the transmission optical system 55, is changed to a perpendicular direction by the direction changing mirror 561. This laser beam is converged by the converging objective lens 562, and thrown, as a pulsed laser beam LBd with a focus spot S, onto the workpiece held on the chuck table 51. The cross-sectional shape of the focus spot S is an elliptical shape with a major axis d1 and a minor axis d2.

Further returning to FIG. 2, the imaging means 58 mounted on the front end portion of the casing 53 constituting the above-mentioned laser beam irradiation means 52 is composed, in the illustrated embodiment, of an ordinary imaging device (CCD) or the like which picks up an image by visible rays. The imaging means 58 sends a signal of the picked-up image to a control means (not shown).

A laser processing method performed using the above-described laser processing apparatus 5 along the streets 21 of the semiconductor wafer 2 will be described with reference to FIGS. 2, 5(a), 5(b) to 9(a), 9(b).

To carry out laser processing along the streets 21 of the semiconductor wafer 2, the semiconductor wafer 2 is placed, with its face 2a pointed upward, on the chuck table 51 of the aforementioned laser processing apparatus 5 shown in. FIG. 2, and the semiconductor wafer 2 is attracted onto and held by the chuck table 51. In FIG. 2, the annular frame 3 mounted with the protective tape 4 is omitted from the illustration, but the annular frame 3 is held by a suitable frame holding means disposed on the chuck table 51.

The chuck table 51 sucking and holding the semiconductor wafer 2 in the above manner is positioned directly below the imaging means 58 by the processing feed mechanism (not shown). Upon positioning of the chuck table 51 directly below the imaging means 58, the imaging means 58 and the control means (not shown) perform an alignment operation for detecting a processing region of the semiconductor wafer 2 to be laser processed. That is, the imaging means 58 and the control means (not shown) carry out image processing, such as pattern matching, for performing alignment between the street 21 formed in a predetermined direction of the semiconductor wafer 2 and the focusing implement 56 of the laser beam irradiation means 52 for throwing a laser beam along the street 21, thereby achieving alignment in terms of the laser beam irradiation position. Similarly, alignment in terms of the laser beam irradiation position takes place for the street 21 formed in the semiconductor wafer 2 and extending perpendicularly to the above predetermined direction.

In the above manner, the street 21 formed in the semiconductor wafer 2 held on the chuck table 51 is detected, and alignment is performed for the laser beam irradiation position. Then, as shown in FIG. 5(a), the chuck table 51 is moved to a laser beam irradiation area, where the focusing implement 56 of the laser beam irradiation means 52 for applying a laser beam is located, to position an end (left end in FIG. 5(a)) of the predetermined street 21 directly below the focusing implement 56 of the laser beam irradiation means 52. Moreover, the focus spot S of the laser beam LBd thrown from the focusing implement 56 is located on the face 2a of the semiconductor wafer 2, namely, a laser beam irradiation surface. At this time, the laser beam LBd thrown from the focusing implement 56 has the major axis d1 of the elliptical focus spot S located along the street 21, as shown in FIG. 5(b). The minor axis d2 in the focus spot S is set to be smaller than the width B of the street 21.

Figure 6:
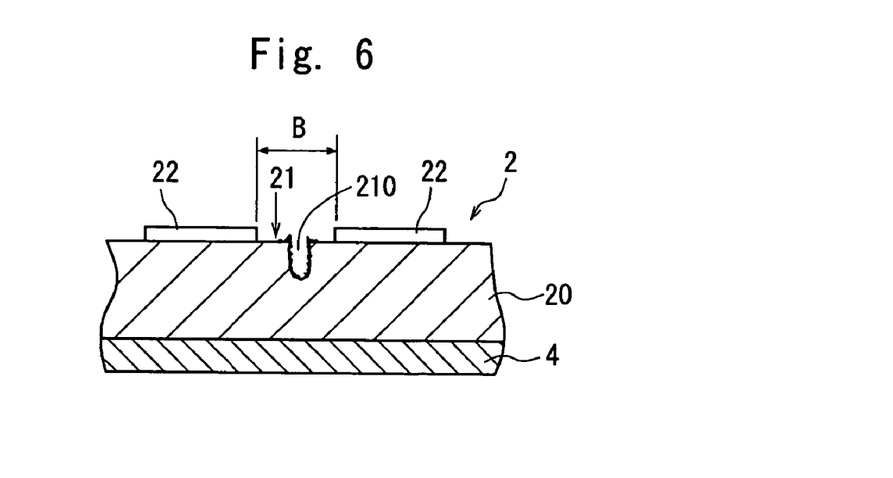
FIG. 6 is an essential part enlarged sectional view of the semiconductor wafer having a laser processed groove formed by the laser processing method for a wafer according to the present invention.

Then, while the focusing implement 56 is irradiating the semiconductor wafer 2 with the pulsed laser beam LBd having a wavelength absorbable to the semiconductor wafer 2, the chuck table 51, i.e., the semiconductor wafer 2, is moved at a predetermined processing feed speed in a direction indicated by an arrow X1 in FIG. 5(a). When the other end (right end in FIG. 5(a)) of the street 21 arrives at the irradiation position of the focusing implement 56 of the laser beam irradiation means 52, the irradiation with the pulsed laser beam is ceased, and the movement of the chuck table 51, i.e., the semiconductor wafer 2, is stopped. As a result, a laser processed groove 210 is formed in the semiconductor wafer 2 along the street 21 (processed groove formation step), as shown in FIG. 6.

Figure 7:
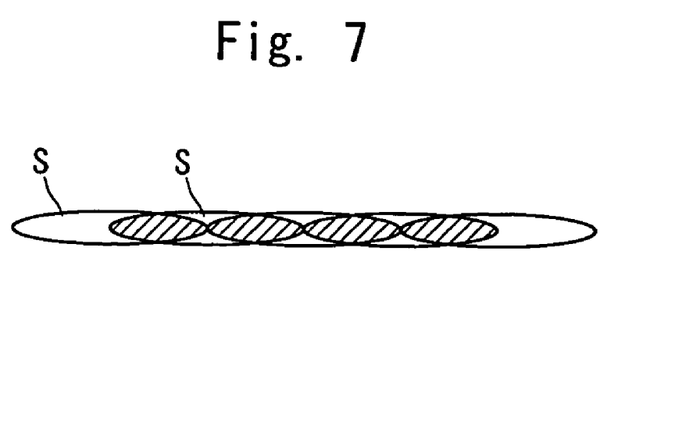
FIG. 7 is an explanation drawing showing a state in which focus spots in an elliptical shape of a pulsed laser beam overlap each other to form adjoining spots.

The laser beam LBd thrown from the focusing implement 56 strikes the semiconductor wafer 2 with the elliptical spot S as stated above. Let the repetition frequency of the pulsed laser beam be Y (Hz), the processing feed speed (the moving speed of the wafer and the pulsed laser beam relative to each other) be V (mm/second), and the length of the major axis of the spot S of the pulsed laser beam (the length in the processing feed direction) be d1. In this case, the processing conditions fulfilling d1>(V/Y) are set, whereby the adjacent spots S of the pulsed laser beam overlap each other in the processing feed direction X, namely, along the street 21, as shown in FIG. 7. In the example shown in FIG. 7, the overlap rate, in the processing feed direction X, of the spots S of the pulsed laser beam is 50%. This overlap rate can be set, as appropriate, by varying the processing feed speed V (mm/second), or varying the length, in the processing feed direction X, of the spot S of the pulsed laser beam.

Figure 8:
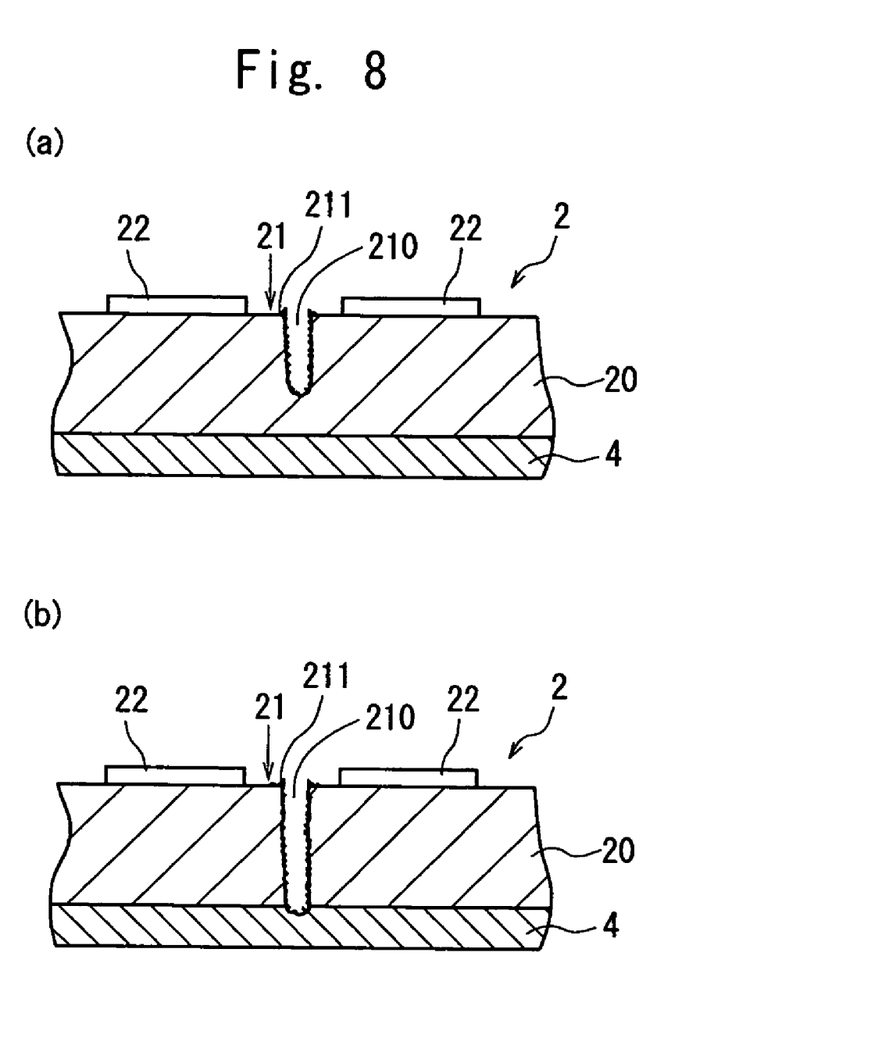
FIGS. 8(a) and 8(b) are essential part enlarged sectional views of the semiconductor wafer having a laser processed groove formed by performing the processed groove formation step a plurality of times in accordance with the laser processing method for a wafer according to the present invention.
Figure 9:
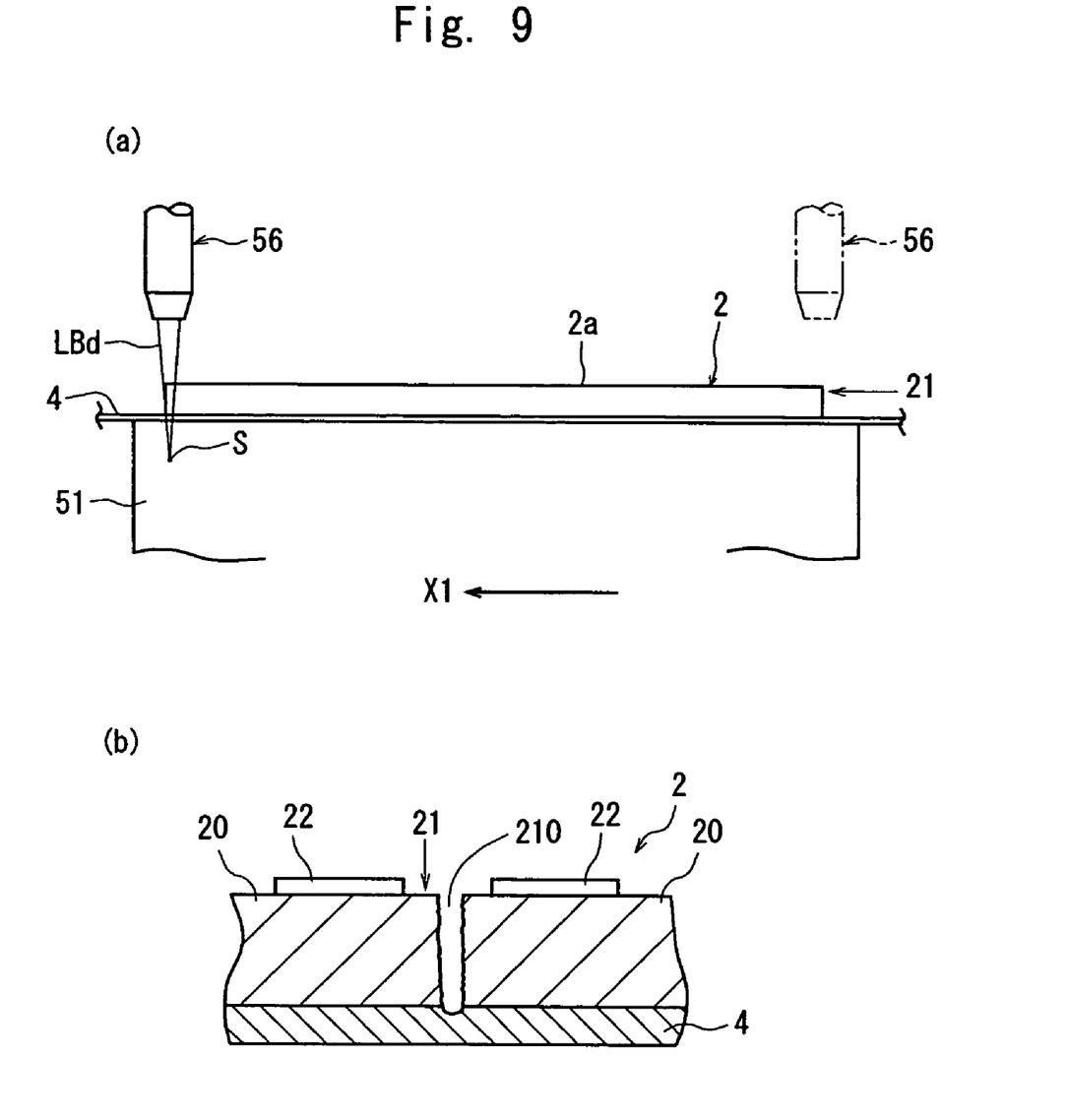
FIGS. 9(a) and 9(b) are explanation drawings of a processed groove finishing step of the laser processing method for a wafer according to the present invention.

The above-described processed groove formation step is performed, for example, under the following processing conditions:

Light source of laser beam: YVO4 laser or YAG laser
Wavelength: 355 nm
Average output: 7 W
Repetition frequency: 10 kHz
Pulse width: 30 ns
Focus spot S: Major axis (d1): 250 µm, minor axis d2: 12 µm
Processing feed speed: 200 mm/second If the laser processed groove 210 formed by the above-described processed groove formation step does not reach the back (underside) of the semiconductor wafer 2, the processed groove formation step is carried out, with the position of the focus spot S being lowered to a location close to the bottom surface of the laser processed groove 210. By this measure, an even deeper laser processed groove 210 is formed, as shown in FIG. 8(a). By further lowering the position of the focus spot S to a location closer to the bottom surface of the laser processed groove 210 and performing the processed groove formation step in this state, a laser processed groove 210 reaching the back (underside) of the semiconductor wafer 2 can be formed, as shown in FIG. 8(b). On both sides of the resulting laser processed groove 210, there are spiny protrusions 211 formed from the material of the wafer which has been melted during irradiation with the laser beam and solidified again. In the processed groove formation step, if the laser processed groove 210 reaches the back of the semiconductor wafer 2, the protective tape 4 is irradiated with the pulsed laser beam LBd. However, the protective tape 4 comprising a sheet of synthetic resin such as polyolefin is permeable to the pulsed laser beam LBd having the above-mentioned wavelength. Thus, the protective tape 4 is not fused.

After the above-described processed groove formation step is performed along all of the streets 21 formed in the predetermined direction in the semiconductor wafer 2, the chuck table 51, accordingly, the semiconductor wafer 2 is turned through 90 degrees. Then, the above-described processed groove formation step is performed along all of the streets 21 formed in a direction perpendicular to the above predetermined direction in the semiconductor wafer 2. As a result, the laser processed grooves 210 are formed along all of the streets 21 in the semiconductor wafer 2, whereby the semiconductor wafer 2 is divided into individual semiconductor chips 20 (see FIG. 8(b)).

Then, a processed groove finishing step is carried out for throwing the laser beam along the laser processed groove 210, while positioning the focus spot beyond the bottom of the laser processed groove 210 formed by the above-mentioned processed groove formation step, thereby removing the spiny protrusions 211 formed on both sides of the laser processed groove 210.

That is, as shown in FIG. 9(a), the chuck table 51 is moved to a laser beam irradiation area, where the focusing implement 56 of the laser beam irradiation means 52 for applying a laser beam is located, to position an end (left end in FIG. 9(a)) of the predetermined street 21 (where the laser processed groove 210 is formed) directly below the focusing implement 56 of the laser beam irradiation means 52. At this time, the focus spot S of the laser beam LBd thrown from the focusing implement 56 is located at a position beyond the bottom of the laser processed groove 210, for example, a position 250 to 350 µm below the face 2a of the semiconductor wafer 2 which is the laser beam irradiation surface.

Then, while the focusing implement 56 is irradiating the semiconductor wafer 2 with the pulsed laser beam LBd having a wavelength absorbable to the semiconductor wafer 2, the chuck table 51, i.e., the semiconductor wafer 2, is moved at a predetermined processing feed speed in a direction indicated by an arrow X1 in FIG. 9(a). When the other end (right end in FIG. 9(a)) of the street 21 arrives at the irradiation position of the focusing implement 56 of the laser beam irradiation means 52, the irradiation with the pulsed laser beam is ceased, and the movement of the chuck table 51, i.e., the semiconductor wafer 2, is stopped. As a result, an outer peripheral portion of the pulsed laser beam LBd acts on both sides of the laser processed groove 210 formed in the semiconductor wafer 2, so that the spiny protrusions 211 (see FIG. 8(b)) formed on both sides of the laser processed groove 210 are removed by the energy of the outer peripheral portion of the pulsed laser beam LBd (processed groove finishing step), as shown in FIG. 9(b).

The above-described processed groove finishing step is performed, for example, under the following processing conditions:

Light source of laser beam: YVO4 laser or YAG laser
Wavelength: 355 nm
Average output: 7 W
Repetition frequency: 10 kHz
Pulse width: 30 ns
Focus spot S: Major axis (d1): 250 µm, minor axis d2: 12 µm
Processing feed speed: 300 mm/second After the above-described processed groove finishing step is performed along all of the streets 21 formed in the predetermined direction in the semiconductor wafer 2, the chuck table 51, accordingly, the semiconductor wafer 2 is turned through 90 degrees. Then, the above-described processed groove finishing step is performed along all of the streets 21 formed in a direction perpendicular to the above predetermined direction in the semiconductor wafer 2. This procedure removes the spiny protrusions 211 formed in the laser processed grooves 210 formed along all of the streets 21 of the semiconductor wafer 2. Thus, the individually separated semiconductor chips 20 show no deterioration in quality.

After the above-described processed groove finishing step is performed, a pickup step is carried out for picking up the semiconductor chips 20 from the protective tape 4 mounted on the annular frame 3. The pickup step is performed using a pickup device 6 illustrated in FIGS. 10 and 11(a) to 11(c). The illustrated pickup device 6 is furnished with a cylindrical base 61 having a bearing surface 611 for bearing the annular frame 3, and an expansion means 62 disposed concentrically within the base 61 for pushing and widening the protective tape 4 mounted on the annular frame 3. The expansion means 62 has a tubular expansion member 621 for supporting an area 41 in the protective tape 4 where a plurality of the semiconductor chips 20 are present. The expansion member 621 is constituted to be movable by an elevating means (not shown) in an up-and-down direction (the axial direction of the cylindrical base 61) between a reference position shown in FIG. 11(a) and an expansion position shown in FIG. 11(b) which is above the reference position. In the illustrated embodiment, ultraviolet irradiation lamps 63 are disposed within the expansion member 621.

The pickup step performed using the above-described pickup device 6 will be described with reference to FIGS. 10 and 11(a) to 11(c).

Figure 10:
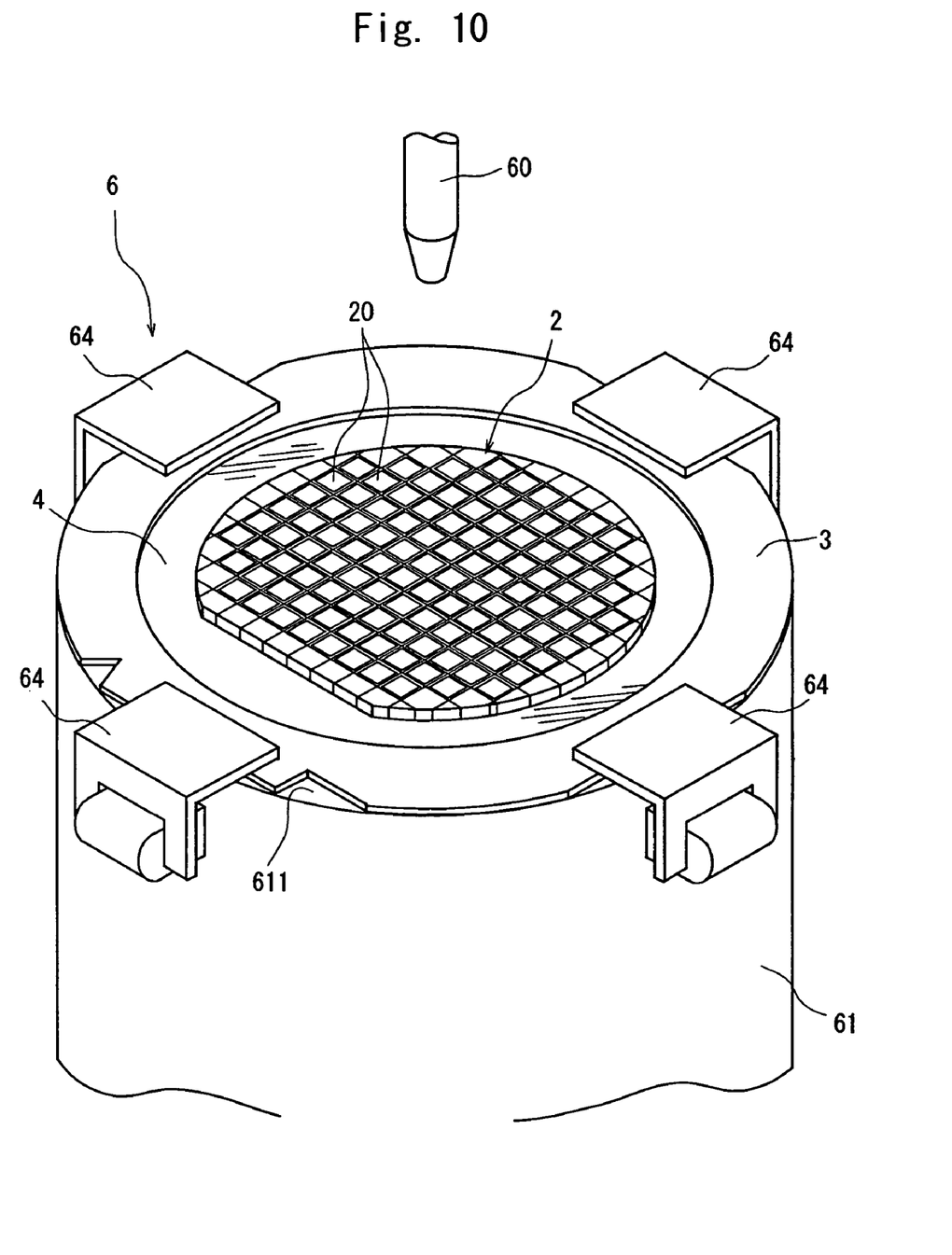
FIG. 10 is a perspective view of a pickup device for performing a pickup step of picking up semiconductor chips.
Figure 11:
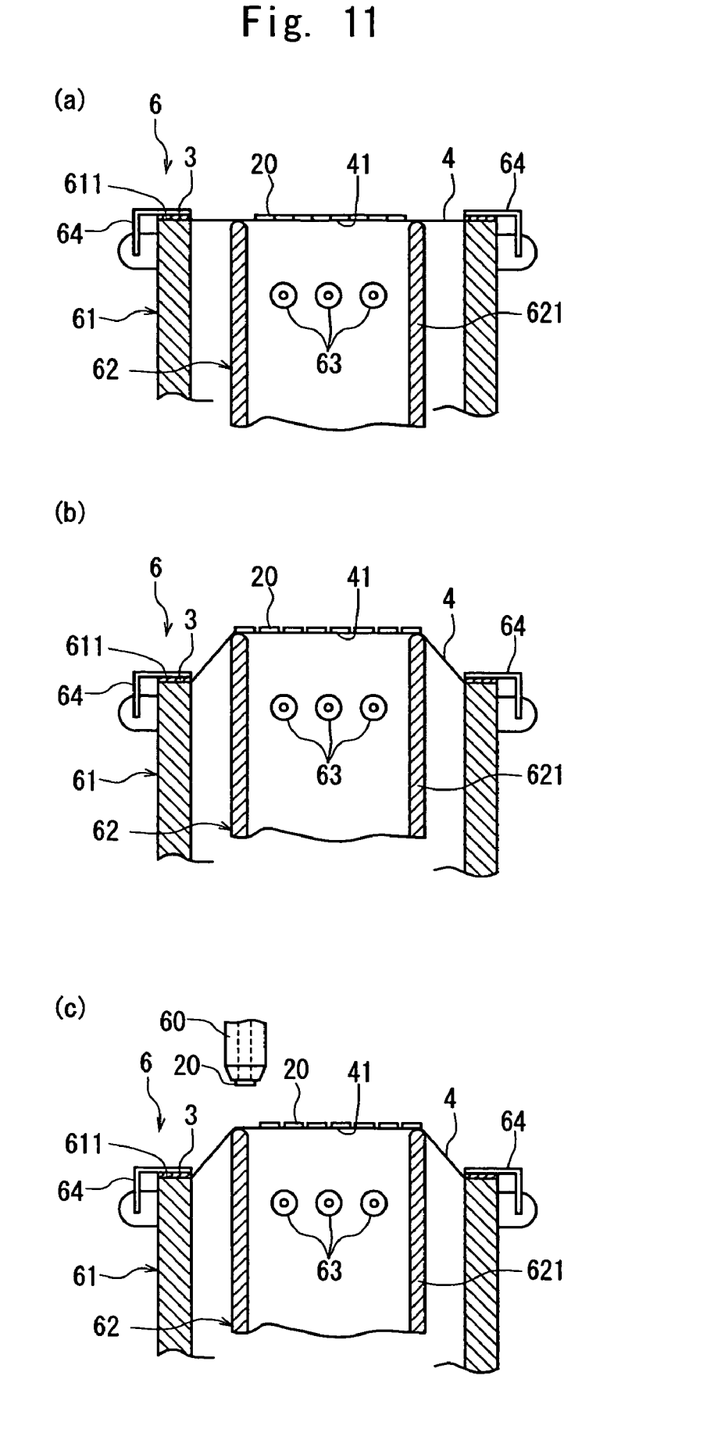
FIGS. 11(a), 11(b) and 11(c) are explanation drawings of the pickup step performed using the pickup device shown in FIG. 10.

A plurality of the semiconductor chips 20 supported on the upper surface of the expansible protective tape 4 mounted on the annular frame 3 in the above-mentioned manner are set in place by placing the annular frame 3 on the bearing surface 611 of the cylindrical base 61, and fixing the annular frame 3 to the base 61 by clamps 64, as shown in FIGS. 10 and 11(a). Then, as shown in FIG. 11(b), the expansion member 621 of the expansion means 62, which has supported the area 41 in the protective tape 4 where the plurality of semiconductor chips 20 are present, is moved by the elevating means (not shown) from the reference position in FIG. 11(a) to the expansion position shown in FIG. 11(b) upward of the reference position. As a result, the expansible protective tape 4 is expanded, so that displacement occurs between the protective tape 4 and the semiconductor chips 20, resulting in decreased adhesion. Thus, the semiconductor chips 20 become easily detachable from the protective tape 4, and clearances are produced between the individual semiconductor chips 20.

Then, as shown in FIG. 11(c), a pickup collet 60 is actuated to detach each semiconductor chip 20 from the upper surface of the protective tape 4 and transport it to a tray (not shown). At this time, the ultraviolet irradiation lamps 63 disposed within the expansion member 621 are lit to irradiate the protective tape 4 with ultraviolet radiation and thereby decrease the adhesive force of the protective tape 4, whereby the semiconductor chips 20 can be detached more easily. In this pickup step, the pickup collet 60 sucks and holds the semiconductor chip 20 to pick it up. If, at this time, the aforementioned processed groove formation step remains in operation, the spiny protrusions 211 formed upon melting and resolidification during irradiation with the laser beam are left on both sides of the laser processed groove 210, as shown in FIG. 8(b). Thus, the protrusions 211 break and fall off, and these protrusions 211 are sucked into the suction hole of the pickup collet 60 to clog the suction hole. In the present invention, however, the aforementioned processed groove finishing step is performed to remove the spiny protrusions 211 formed on both sides of the laser processed groove 210. This precludes the pickup collet 60 from sucking the protrusions 211 to clog the suction hole.

While the present invention has been described in detail based on the illustrated embodiments, it is to be understood that the invention is not limited to such embodiments, but various changes and modifications may be made without departing from the scope of the invention. For example, the focus spot S of the pulsed laser beam LBd used in the processed groove formation step and the processed groove finishing step is elliptical, but the focus spot of the pulsed laser beam may be circular or rectangular. Moreover, before the processed groove formation step is performed, the face (laser beam irradiation surface) of the semiconductor wafer 2 may be coated with a protective film comprising a resin such as polyvinyl alcohol, whereby debris generated during formation of the laser processed groove can be prevented from adhering to the device 22.

What is claim is:

1. A laser processing method for a wafer, the wafer having a plurality of regions defined by streets formed in a lattice pattern on a face of the wafer, the defined regions having a plurality of devices formed therein, the method being arranged to irradiate the wafer with a laser beam along the streets, thereby forming laser processed grooves along the streets, comprising:

a processed groove formation step of irradiating the wafer with the laser beam, which has a wavelength absorbable to the wafer, along the streets, with a focus spot being positioned on a laser beam irradiation surface of the wafer, thereby forming the laser processed grooves along the streets; and a processed groove finishing step of irradiating the wafer with the laser beam, which has a wavelength absorbable to the wafer, along the laser processed grooves, with a focus spot being positioned beyond a bottom of the laser processed grooves formed by the processed groove formation step, thereby finishing both sides of the laser processed grooves.

2. The laser processing method for a wafer according to claim 1, wherein the focus spot of the laser beam applied by irradiation in the processed groove finishing step is set at a position 250 to 350 μm below the laser beam irradiation surface of the wafer.

* * * * *